(12) United States Patent
Schmale (10) Patent No.: US 10,727,630 B2
(45) Date of Patent: Jul. 28, 2020

(54) CONNECTING DEVICE

(71) Applicant: MTS SENSOR TECHNOLOGIE GMBH & CO. KG, Lüdenscheid (DE)

(72) Inventor: Thomas Schmale, Meinerzhagen (DE)

(73) Assignee: MTS SENSOR TECHNOLOGIE GMBH & CO. KG, Ludenscheid (DE)

( * ) Notice: Subject to any disclaimer, the term of this patent is extended or adjusted under 35 U.S.C. 154(b) by 0 days.

(21) Appl. No.: 16/359,640

(22) Filed: Mar. 20, 2019

(65) Prior Publication Data

US 2019/0296504 A1 Sep. 26, 2019

(30) Foreign Application Priority Data

Mar. 20, 2018 (DE) .................... 20 2018 101 541 U
Feb. 26, 2019 (DE) .................... 20 2019 101 084 U (51) Int. Cl.
| | |
|---|---|
| H01R 13/74 | (2006.01) |
| H02G 3/22 | (2006.01) |
| H02G 1/06 | (2006.01) |
| H02G 3/06 | (2006.01) |
| H01R 13/52 | (2006.01) |

(Continued)

(52) U.S. Cl.
CPC ......... *H01R 13/74* (2013.01); *H01R 13/5202* (2013.01); *H01R 31/06* (2013.01); *H01R 43/26* (2013.01); *H02G 1/06* (2013.01); *H02G 3/0616* (2013.01); *H02G 3/22* (2013.01); *F15B 15/2861* (2013.01); *H01R 2201/20* (2013.01)

(58) Field of Classification Search
CPC .. H01R 13/629; H01R 13/5202; H01R 13/74; H01R 43/26; H02G 3/22; H02G 3/0616

USPC ................................ 439/521, 345; 174/74 R
See application file for complete search history.

(56) References Cited

U.S. PATENT DOCUMENTS

| | | | |
|---|---|---|---|
| 3,483,789 A | 12/1969 | Wurzel | |
| 3,732,527 A * | 5/1973 | McKnight | .............. H01R 13/56 439/471 |

(Continued)

FOREIGN PATENT DOCUMENTS

DE 202006018568 U1 4/2007

OTHER PUBLICATIONS

Example of push-in fixes available before Mar. 19, 2018.

*Primary Examiner* — Hien D Vu
(74) *Attorney, Agent, or Firm* — Steven M. Koehler; Westman, Champlin & Koehler (57) ABSTRACT

A cable connection system for a thick-walled case having a tiered cable opening with a an inner portion and an outer portion, the inner portion having a first diameter, and the outer portion having a second diameter larger than the first diameter, including a connecting part rotatably mountable in the tiered cable opening to direct cables of the cable connection system into a desired angular position with respect to the case. The connecting part includes a body with a first section having a first section diameter matching the inner portion first diameter and a second section having a second section diameter matching the outer portion second diameter. A fixation disc is configured to lock the connecting part into the tiered cable opening when the cables of the cable connection system are adjusted to the desired angular position. The fixation disc has a central opening configured to fit the second section diameter and a shaped outer contour having a diameter configured to press into the outer portion.

14 Claims, 10 Drawing Sheets

(51) Int. Cl.
*H01R 43/26* (2006.01)
*H01R 31/06* (2006.01)
*F15B 15/28* (2006.01)

(56) References Cited

U.S. PATENT DOCUMENTS

| | | | |
|---|---|---|---|
| 4,073,514 A | | 2/1978 | Pate |
| 4,078,298 A | | 3/1978 | Hurst |
| 4,454,381 A | | 6/1984 | Ito et al. |
| 5,603,530 A | | 2/1997 | Guest |
| 6,113,429 A | * | 9/2000 | Weigel ................ H01R 13/506 439/607.41 |
| 6,244,892 B1 | * | 6/2001 | McCarthy ............ H01R 4/5025 439/421 |
| 6,948,971 B2 | * | 9/2005 | Bartholoma ......... H01R 13/506 174/74 R |
| 7,552,803 B2 | | 6/2009 | Luce |
| 8,695,764 B2 | | 4/2014 | Luce |
| 8,853,537 B2 | | 10/2014 | Kempeneers et al. |
| 9,450,393 B2 | | 9/2016 | Thompson et al. |
| 9,699,927 B2 | | 7/2017 | Takahashi et al. |

\* cited by examiner

CONNECTING DEVICE

FIELD

This disclosure concerns a connecting device for connecting an electrical or electronic component, and in particular, connecting cables of an electrical or electronic component through a wall of an enclosure.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One general aspect includes a cable connection system for a thick-walled case having a tiered cable opening with a an inner portion and an outer portion, the inner portion having a first diameter, and the outer portion having a second diameter larger than the first diameter, the cable connection system including: a connecting part rotatably mountable in the tiered cable opening to direct cables of the cable connection system into a desired angular position with respect to the case, the connecting part including: The cable connection system also includes a body with a first section having a first section diameter matching the inner portion first diameter and a second section having a second section diameter matching the outer portion second diameter. The cable connection system also includes a fixation disc configured to lock the connecting part into the tiered cable opening when the cables of the cable connection system are adjusted to the desired angular position, the fixation disc having a central opening configured to fit the second section diameter and a shaped outer contour having a diameter configured to press into the outer portion.

Implementations may include one or more of the following features. The cable connection system where the connecting part further includes: a plug part extending outward from the second section; and a connection plug extending inward from the first section, the plug part and the connection plug electrically connected. The cable connection system where the fixation disc is a spring metal crown disc having an inner diameter sized to fit over the second section. The cable connection system where the fixation disc includes an outer circumference and a plurality of teeth annularly spaced apart about the outer circumference, where the fixation disc has a diameter greater than the second section diameter. The cable connection system where the plurality of teeth are configured in a inclined orientation toward the first section from a transition between the first section and the second section. The cable connection system where the plug part has a case made of a thermoplastic material. The cable connection system where the plug part includes metallic contact pins pressed into the second section of the body. The cable connection system where the metallic contact pins have a conically shaped portion, which lies in the second section of the body. The cable connection system where the connection plug of the connecting part has a plug connector. The cable connection system and further including a sealing ring at an outer circumference of the connecting part, configured to seal against a shelf between the inner portion and the outer portion of the tiered cable opening. The cable connection system and further including: a tool for installation of the connecting part, the tool including a hollow cylindrical body having an external diameter adapted to the external diameter of the fixation disc. The cable connection system where one end of the hollow cylindrical body has a shape adapted to engage the fixation disc of the cable connection system. The cable connection system where the thick-walled case includes a hydraulic cylinder of a hydraulic system, the hydraulic cylinder having an electrical or electronic assembly used. The cable connection system the cable connection system where the connecting part further includes: a central through-hole; and a deflection element rotatable in the tiered cable opening to direct cabling routing in a determined direction. The cable connection system and further including: a tool for the installation of the connecting part, the tool including a hollow cylindrical body having an external diameter adapted to the external diameter of the fixation disc. The cable connection system may also include at least one lateral opening in a lower portion of the hollow cylindrical base body. The cable connection system where the at least one lateral opening is four lateral openings evenly spaced about a circumference of the hollow cylindrical body.

One general aspect includes a method of mounting a cable connection system in a hydraulic cylinder wall, the hydraulic cylinder wall having a thick-walled case having a tiered cable opening with a an inner portion and an outer portion, the inner portion having a first diameter, and the outer portion having a second diameter larger than the first diameter, the method including: threading a cable through the cable opening from an interior of the hydraulic cylinder wall; connecting the cable to a connecting part having a body with a first section having a first section diameter matching the inner portion first diameter and a second section having a second section diameter matching the outer portion second diameter; rotatably mounting the connecting part in the tiered cable opening to direct the cable into a desired angular position with respect to the case; and locking the connecting part in the opening by press-fitting a fixation disc into the cable opening.

Implementations may include one or more of the following features. The method where the fixation disc has a central opening configured to fit the second section diameter and an outer circumference with a plurality of teeth annularly spaced apart about the outer circumference and configured in an inclined orientation toward the first section from a transition between the first section and the second section, where locking the connecting part includes installing the fixation disc in an orientation where the incline of the teeth extends away from the first section toward an outer wall of the hydraulic cylinder.

BACKGROUND

Some examples of connecting devices and cable connection systems include: U.S. Pat. Nos. 4,454,381; 7,552,803 B2; and 8,695,764 B2.

Currently, mainly cable screws are used for sealing and loading electrical devices installed in enclosures. Cable screws that correspond to International Electrotechnical Commission standard International Protection Marking IP69 are expensive and have the disadvantage that plastics such as cable coat shrink or crawl, thus leading to leaking over a period of time. In addition, cable screws can be improperly tightened, which can damage plastic and sealing parts, which also leads to malfunctions.

Systems with cable screws also have the serious disadvantage that a tightness or protective class up to IP 69 can be achieved by ring-shaped pressing of a rubber or elastomer ring, but also the jacket or sheath of a connection line is heavily constricted at the sealing point. Since the material of the jacket, often plastic PVC or PUR, 'flows away' with time due to the force of constricting, and leaks inevitably occur over time.

In the case of another system, a connecting part with which the connection cable is guided through the wall of the case part is equipped with a square assembly plate, which at each of the corners has a hole to accommodate a fastening screw to connect the connector part with the case part. In addition to drilling for the inclusion of a cylindrical base body in the connecting part, four additional threaded holes are required to attach this connection device to the case part, and four screws mounted into the connector device and the case part are required for assembly. This solution therefore requires a considerable amount of work and time.

BRIEF DESCRIPTION OF DRAWINGS

The advantages and expediency of the invention also arise from the subsequent description of an example of execution on the basis of the figures. Of these show.

DETAILED DESCRIPTION

Embodiments of the present disclosure are directed toward a connecting device for connecting an electrical or electronic component which is housed in a thick-walled case part, by a graduated hole in the wall of the case part. Embodiments are further directed toward a tool for assembling the connector and, to a hydraulic cylinder of a hydraulic system in which the proposed cable connection system is used.

Currently, there is no connector device for electrical appliances or sensors which makes it possible to install a connector in a thick wall or case in a simple and safe way through walls or enclosures, without using screws, threads or adhesives.

The embodiments of the present disclosure are therefore based on the task of providing a constructively simple connector system that can be assembled with a reduced installation complexity and corresponding time.

Embodiments of the disclosure replace the functionally proven but time-consuming and expensive concept of a connecting device screwed into the case wall. The embodiments further include providing a plugged connector fixed in position by a backup element in the hole of the housing wall. Embodiments of the connector device are suitable for use with electrical or electronic assemblies or devices (such as sensors) that are used in thick-walled enclosures, such as hydraulic or pneumatic cylinders, and whose connections outside the housing must be kept.

In the various embodiments of the present disclosure, advantages include:

permanent waterproofing by thermoplastic sprayed molding or over-molding on the connector cable, further O rings or sealing lips;

permanent waterproofing up to IP69k, which is high pressure cleaner suitable;

process-proof and easy plug-in assembly; no screws, threads or adhesives necessary;

use of a rotational symmetrical hole, no threaded holes or screws required;

permanent fixation of the connector part by way of a pressed crown disc;

permanent fixation of cable/plug via form-fitting geometries;

free and adjustable alignment of the connection part during assembly, wherein the cable outlet can be arranged at any angle.

Figure 1A:
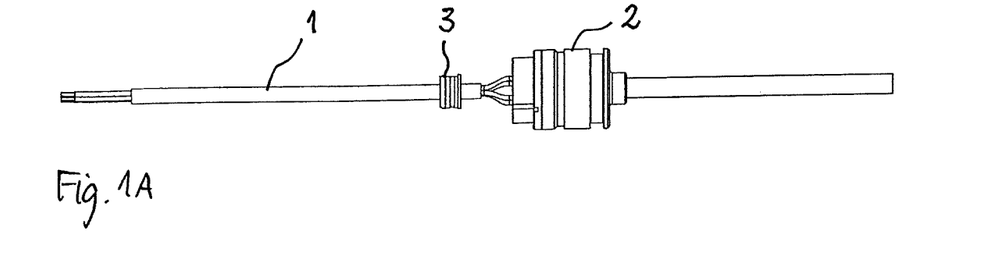
FIG. 1A-1D the essential components of an embodiment of the inventive cable connection system in perspective.
Figure 1B:
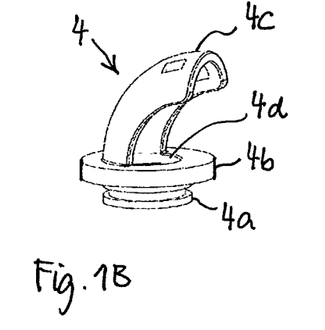
Figure 1C:
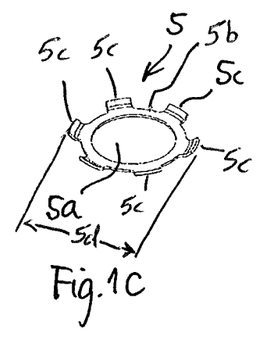
Figure 1D:
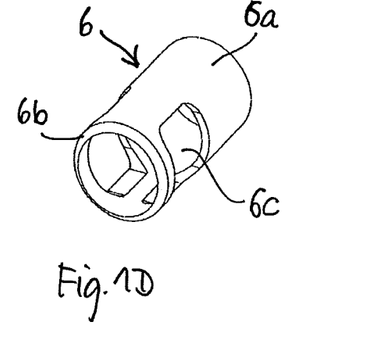
Figure 2:
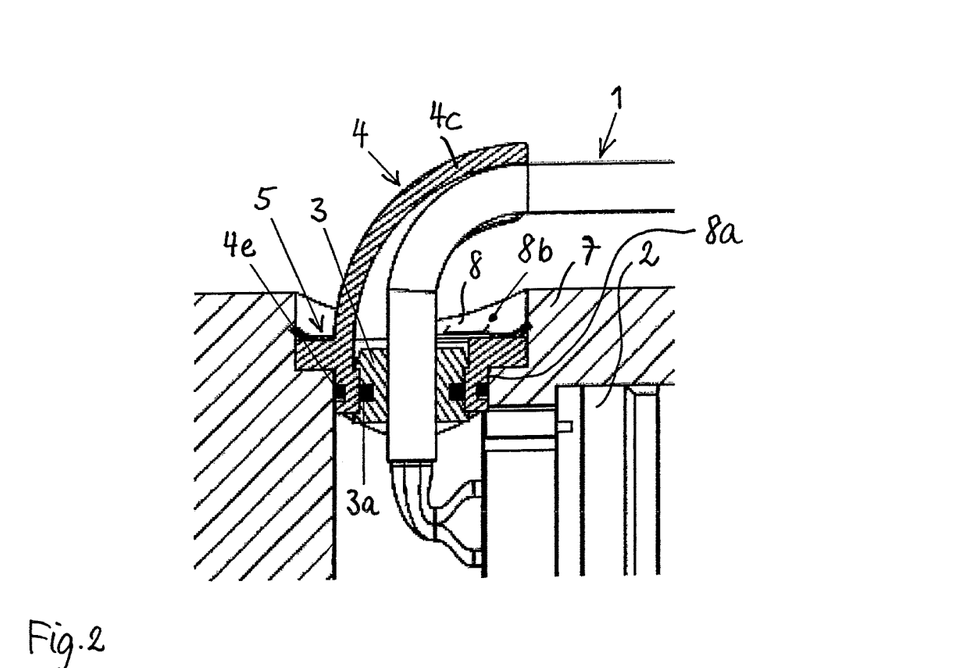
FIG. 2 a detailed view of the cable connection system in the assembled state, in a longitudinal representation.
Figure 3:
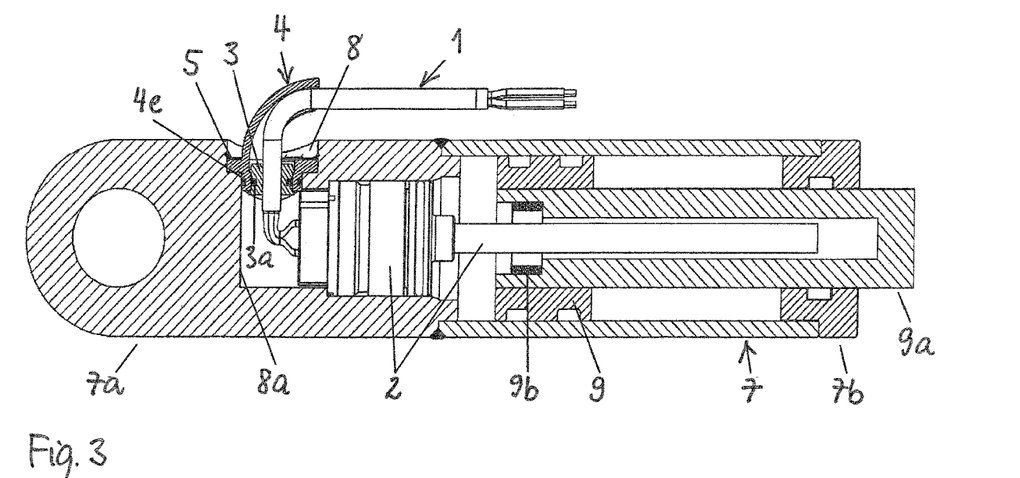
FIG. 3 a longitudinal representation of a hydraulic cylinder in which the resource-like cable connection system is installed.

In connector system embodiment of the disclosure as shown in FIGS. 1A-4J, and particularly in FIGS. 1B and 2-3, a cable diversion trim of a flange part is essentially curved in a quarterly form. In principle, however, the shape of the cable deflection handle is not limited to this and also to a circular segment form, but can also correspond to a section of an ellipse or include straight-running sections.

In a further version, the cable steering trim of the flange part has an essentially semi-circular cross-section. In principle, however, the cross-sectional shape of the cable steering part can differ from this and describe, for example, a smaller or larger part of a circle (up to a closed circular shape) or an ellipse or similar.

In a further embodiment, the cable steering trim of the flange part tapers itself from its end adjacent to the second cylindrical section of the base body to its free end. However, the light width of the cable diversion handle can also be constant over its entire extension.

In further embodiments, at the outer section and/or interior of the flange part, at least one sealing lip or a seal ring is provided. In particular, the sealing lip or the sealing ring is arranged on the first cylindrical section of the flange part. Depending on the requirements of the application, several sealing lips or—rings may also be provided, possibly made of different materials. Sealing between the connector cable and the flange part can also be done largely or completely by sealants attached or shaped to the connector cable or to a sealant plug placed or sprayed on it.

In a further embodiment of the cable connection system, the fixation disc is executed as a spring metal crown disc. In principle, however, different safety discs or completely different fixation or securing elements can also be used to fix the flange part, although—depending on the application—these may alternatively be elements which cannot be easily removed, such as by gluing or other bonding.

In addition to a cable connection system of the type explained above, the cable connection system includes a connection cable with attached, in particular sprayed or molded, sealing plug having its outer diameter adapted to the inner diameter of the through-hole of the flange part.

A suitable tool for assembling the cable performance described herein with respect to FIGS. 1A-4J has a hollow-cylindrical base body with an external diameter adapted to the outer diameter of the fixed disc of the cable transmission and at least one lateral opening, prefers two opposite similar openings, in the cylinder circumference, the dimensions of which exceed the outside diameter of the cable steering part of the flange part in such a way that a threading of the tool over it for putting on the in the graded drilling of the wall inserted fixation disc is possible.

In embodiments of the tool, the basic body is not necessarily hollow-cylindrical over its entire extension, but can only include a hollow cylinder segment in sections or have a basic shape different from a hollow cylinder.

The hydraulic cylinder is characterized by the fact that in the wall of the headboard part of the hydraulic cylinder, a tiered hole with an inner drilling section with a first diameter and an outer drilling section with a second diameter larger than the first diameter is provided and the cable transmission of the cable connection system is fixed with the inserted connection cable in the graded hole.

Reference is made to FIGS. 1A-4J for a more detailed description of the embodiments discussed above.

FIG. 1A shows a connection cable 1 of a position sensor assembly 2, which is intended for installation in a hydraulic cylinder of a hydraulic system (see FIGS. 2-4J). It can be seen that near the end of connection cable 1 attached to the position sensor assembly 2 is a sealing plug 3. Sealing plug 3 is over-molded to the connection cable 1, by which a robust connection between sealing plug 3 and the connection cable 1 is formed.

FIG. 1B shows a flange part 4 of the cable system according to an embodiment. The flange part 4 has a first base section 4a with a first outer diameter and a subsequent second cylindrical base section 4b with a second, larger, outer diameter. From the base body sections 4a, 4b, a curved cable steering trim 4c protrudes upwards. In FIG. 1B, it can also be seen that the base body sections 4a, 4b have a transit hole 4d therethrough. It can be seen that the cable steering trim 4c extends out of the base body in the form of a quarter circle and has a roughly semicircular cross-section.

FIG. 1C shows a crown disc 5, which serves as a fixation disc of the connector device according to the disclosure. The crown disc 5 has a circular central opening 5a, the diameter of which is slightly larger than the outer circumference of the cable steering part 4c, and a toothed outer circumference of 5b, and when the crown disc 5 is installed, is configured to abut the outer diameter of the second cylindrical section 4b of the flange part 4 and fit in the hole 8 section diameter 8a (see FIG. 2) (and thus at the same time is adjusted to the diameter of a drill mentioned below). Teeth 5c extend from outer circumference 5b, and in one embodiment, are spaced apart annularly around the outer circumference 5b. Teeth 5c extend to a widest diameter 5d that is in one embodiment slightly larger than the diameter of the second cylindrical base section 4b. The teeth 5c are in one embodiment in an inclined orientation, with the teeth 5c inclined toward the first section from a transition between the first section and the second section when the crown disc is properly installed.

The crown disc is adapted for engagement and locking in the said hole 8 with application of appropriate force (see also below).

FIG. 1D shows a tool 6 suitable for the installation of the crown disc 5 in the said hole 8. Tool 6 has a tubular or hollow-cylindrical base body 6a, the outer diameter of which, as well as the aforementioned outer contour of the crown disc, is matched closely to the diameter of the outer, further part of the aforementioned hole. One end of the pipe body 6a has an opening 6b. In the pipe body 6a, two approximately rectangular shaped openings 6c are provided, opposite each other. The purpose of the construction of tool 6, which was briefly sketched here, and its handling during the installation of the connector system and especially the crown disc 5, are explained below.

FIG. 2 shows in a longitudinal representation the cable connection system with the parts explained above in the installation state in a case part 7. In the thick wall of case part 7, a tiered hole 8 is created, which has an inner section 8a with a first diameter and an outer section 8b with a second, larger diameter. For example, the case can be the hydraulic cylinder of a hydraulic system; See FIG. 3 and the explanation below.

As is shown in FIG. 2, flange part 4 sits in hole 8 of case 7 in such a way that its first base body section 4a (see FIG. 1B) is fitted in inner section 8a of hole 8 and the second base body section 4b is fitted in the outer drilling section 8b and on the ring-shaped front of the outer drilling section 8b. In this position, the flange part 4 is held by the crown disc 5. In the transit hole 4d of flange part 4, on the other hand, the sealing plug 3 is fit, and in this the connector cable 1, the ends of which are diverted within the case 7 and soldered or otherwise connected with the position sensor assembly 2. It can also be seen that the connection cable is diverted by the cable steering part 4c of flange part 4 in a direction parallel to the longitudinal stretching of the case. This orientation may be adjusted as discussed further below.

Both the outer circumference of the sealing plug 3 and the outer circumference of the first base part section 4a of the flange part 4 include a ring nut (not separately designated), in which there is a seal ring 3a and 4e respectively. These sealing rings (e.g., O-rings) achieve a high-grade tightness of cable performance in accordance with relevant standards.

FIG. 3, also in a longitudinal display, shows a general view of a hydraulic cylinder 7 embodiment of a thick-walled case part in which the cable connection system is used. Parts already shown in FIG. 2 are marked with the same reference numerals as there and are not explained again. The hydraulic cylinder 7 has a cylinder 7a and a cylinder closure 7b, through which a piston rod 9a of a piston 9 passes in the middle. Position sensor assembly 2 is used to determine the position of piston 9 with regard to hydraulic cylinder 7 and works together with a position magnet 9b, which is inserted into the inner wall of the piston rod 9a.

FIGS. 4A-4J illustrate a way of using the system of FIGS. 1A-3, which is based on the figures explained above, the steps of the production of the cable performance according to the invention. Only a few reference figures are included in these figures. With respect to the other parts/sections of the components shown, reference is made to FIGS. 1A-3 and the above explanations.

Figure 4A:
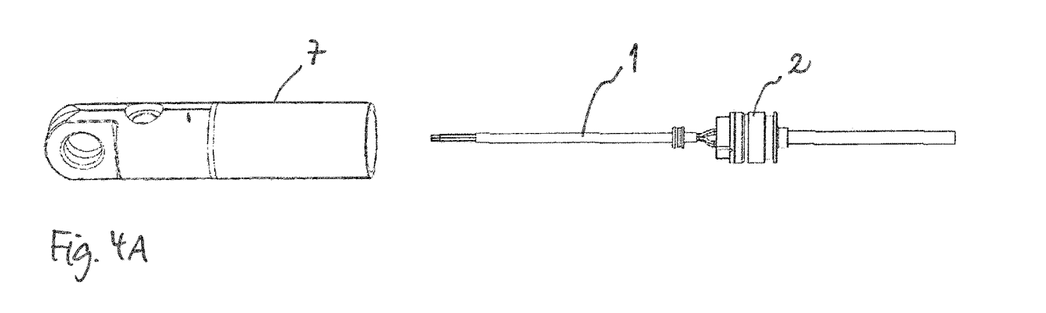
FIG. 4A-4J manufacturing steps of the in FIG. 3 hydraulic cylinders shown in a perspective representation (FIG. 4A) or longitudinal representations (FIG. 4B-4J)
Figure 4B:
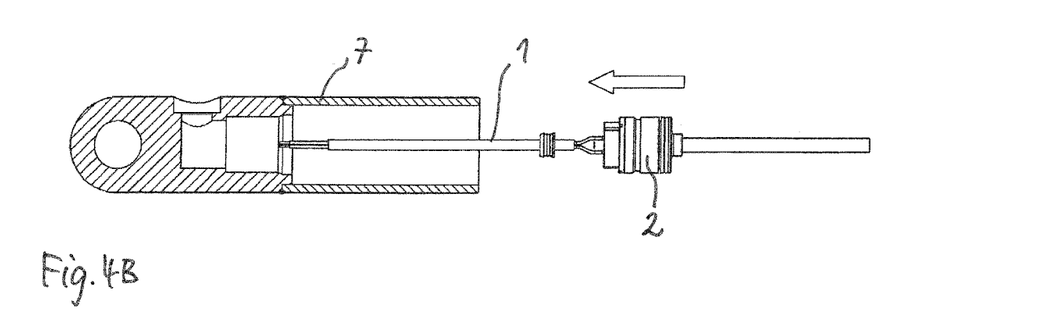
Figure 4C:
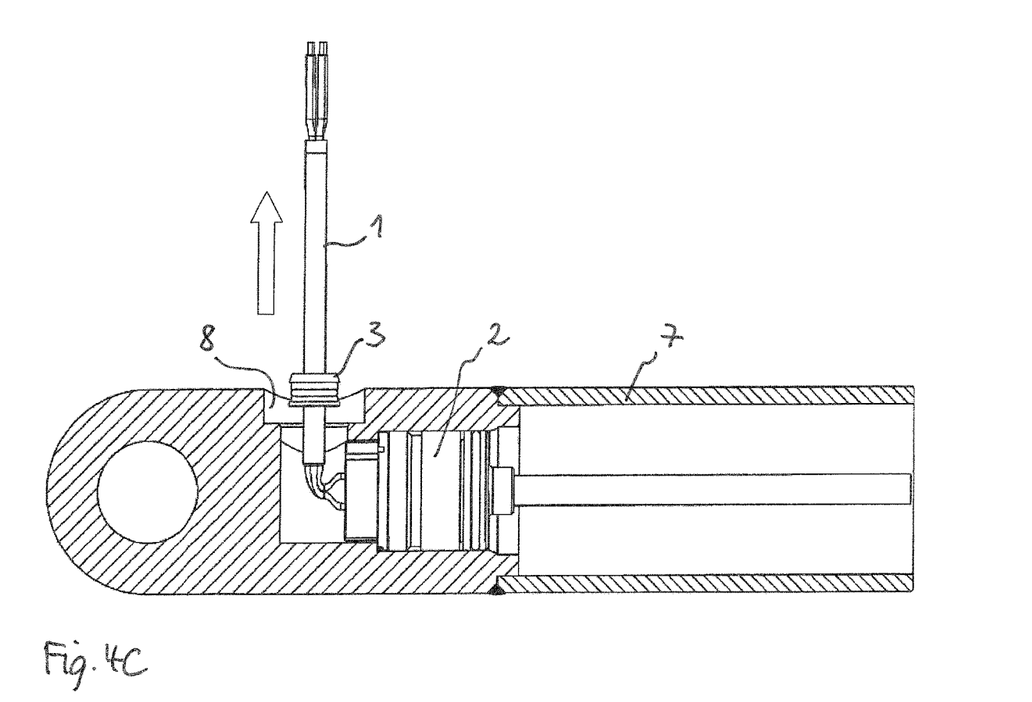

FIGS. 4A and 4B show how the position sensor assembly 2 is aligned with and inserted or otherwise threaded through the hydraulic cylinder 7 with attached connection cable 1 axially and inserted in the middle of it. In FIG. 4C, the position sensor assembly is shown to have reached the target stage of the cylinder floor 7a at the cylinder floor 7a of the hydraulic cylinder, where it sits in a tiered axial hole adapted to its outer shape. When inserted, the connection cable 1 with the sealing plug 3 is guided through the graded radial hole 8 through the wall of the cylinder floor to the outside.

Figure 4D:
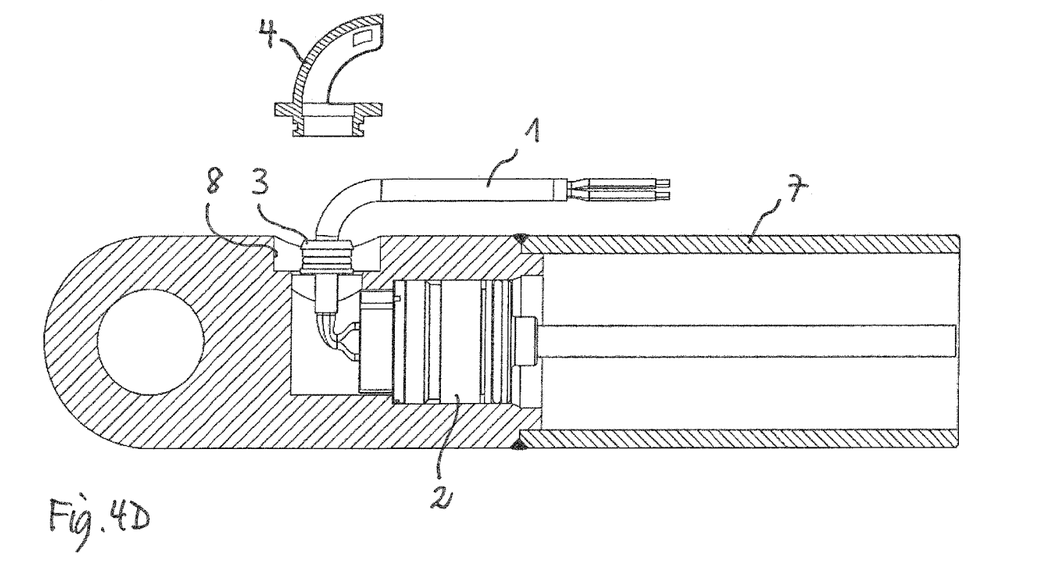
Figure 4E:
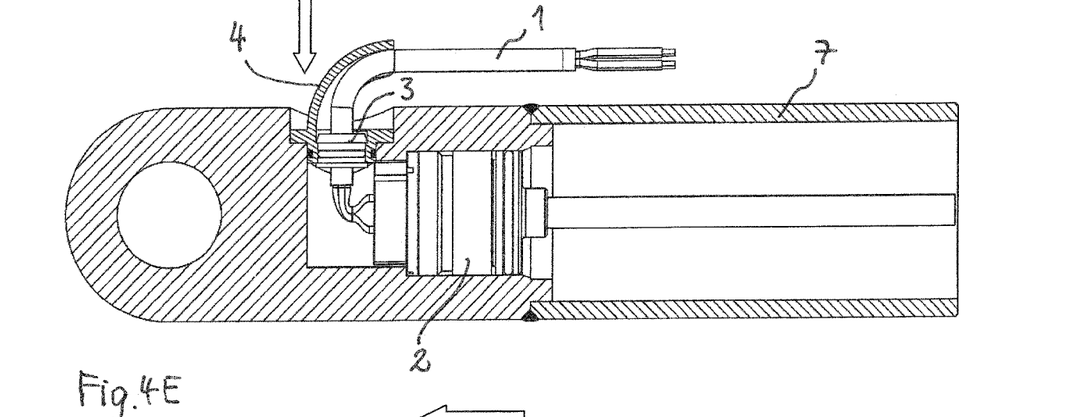

FIG. 4D shows schematically that the flange part 4 is then inserted into the hole 8, whereby the free end of the connection cable 1 is guided through the passage hole 4d of the flange part 4 and along the cable diversion part 4c, so that it is essentially applied with the flange part 4, running parallel to the wall of hydraulic cylinder 7. At the same time, the sealing plug 3 at the connection cable 1 is pushed into the passage hole 4d of the flange part 4. This configuration is shown in FIG. 4E. It should be noted that the free rotatability of flange part 4 in hole 8 also allows any other orientations of the cable gradient, diagonally or vertically to the longitudinal axis of the hydraulic cylinder 7.

Figure 4F:
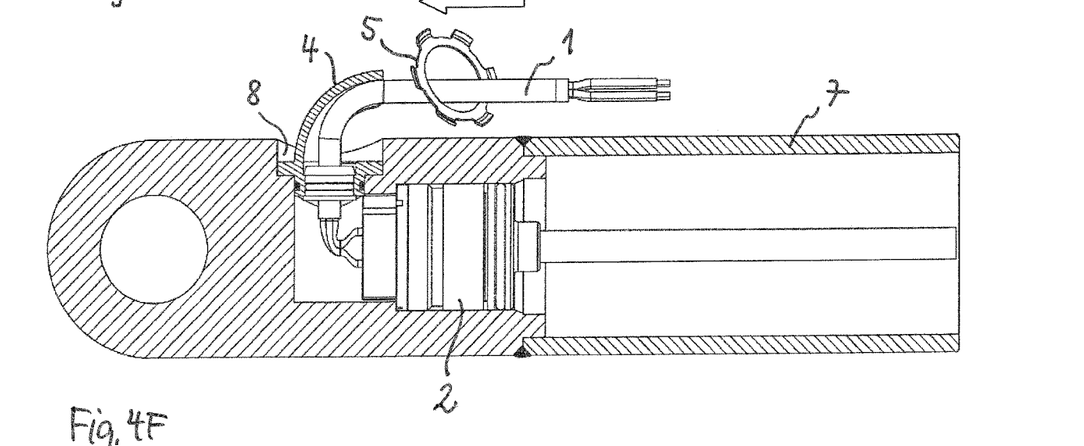
Figure 4G:
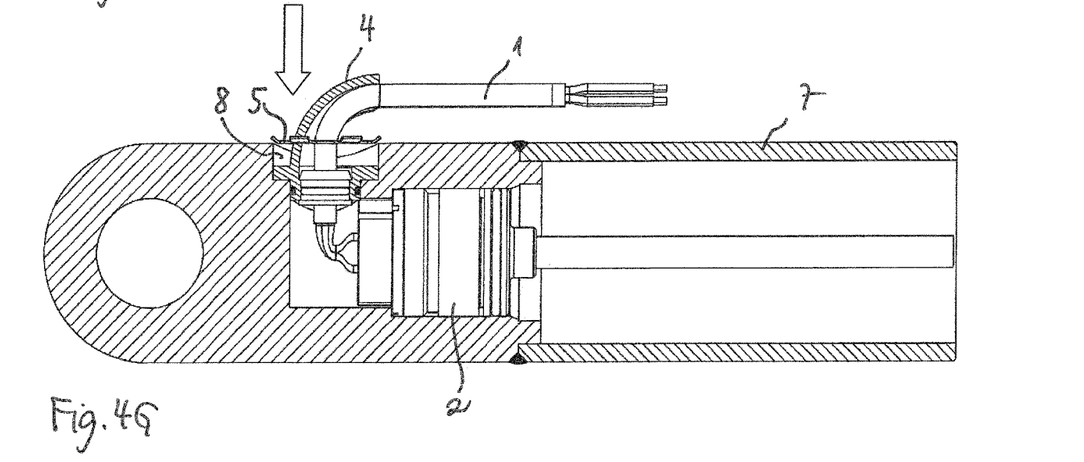

FIG. 4F shows initial installation of crown disc 5, which is aligned with hole 8 by guiding the crown disc 5 over the end of the connection cable 1 and over the cable diversion part 4c of flange part 4. FIG. 4G shows the positioning of crown disc 5 over the entrance to hole 8, prior to its full installation.

Figure 4H:
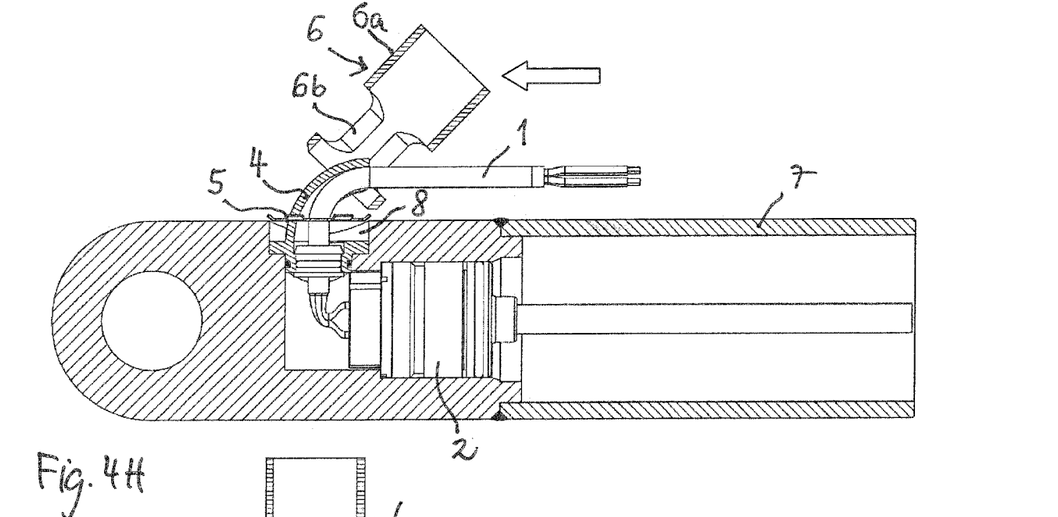
Figure 4I:
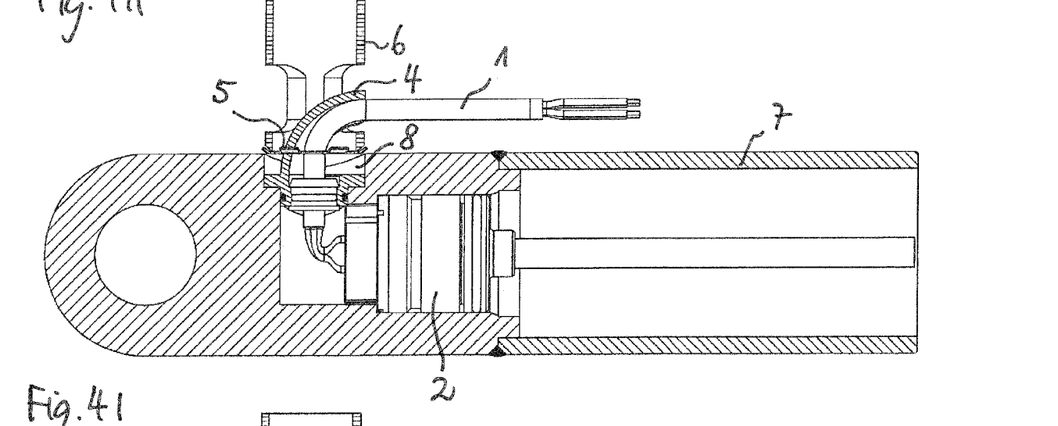
Figure 4J:
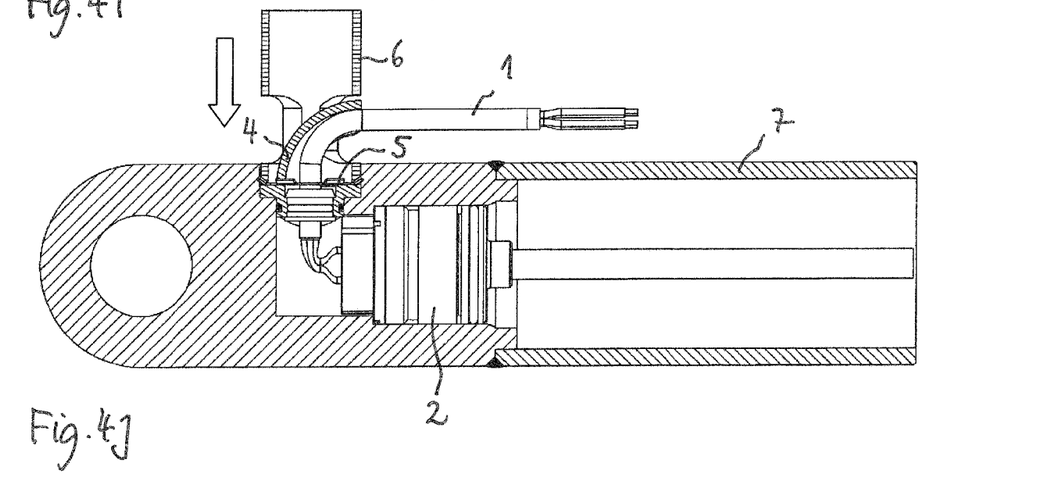

FIGS. 4H to 4J show how the assembly tool is then used to fully install the crown disc 5. Tool 6 is guided over the free end of the connection cable 1 and the cable deflection trim 4c of flange part 4 and is placed radially on the crown disc 5. From these figures, the purpose of the lateral extensions 6b can be seen in the basic tool body 6a. When the tool 6 is correctly aligned radially, it is pressed down on the crown disc 5 and presses the crown disc 5 into hole 8, where the crown disc 5 rests with its wall (FIG. 4J). In the latter figure, it can also be seen that the side openings 6b of tool 6 are sized so that they allow movement of tool 6 into hole 8 until the crown disc 5 rests on the free surface of the second base body section of the flange part 4 without the basic body 6a of the tool 6 hitting the cable steering trim 4c of the flange part 4.

Figures 5A, 5B, 5C, 5D, 6:
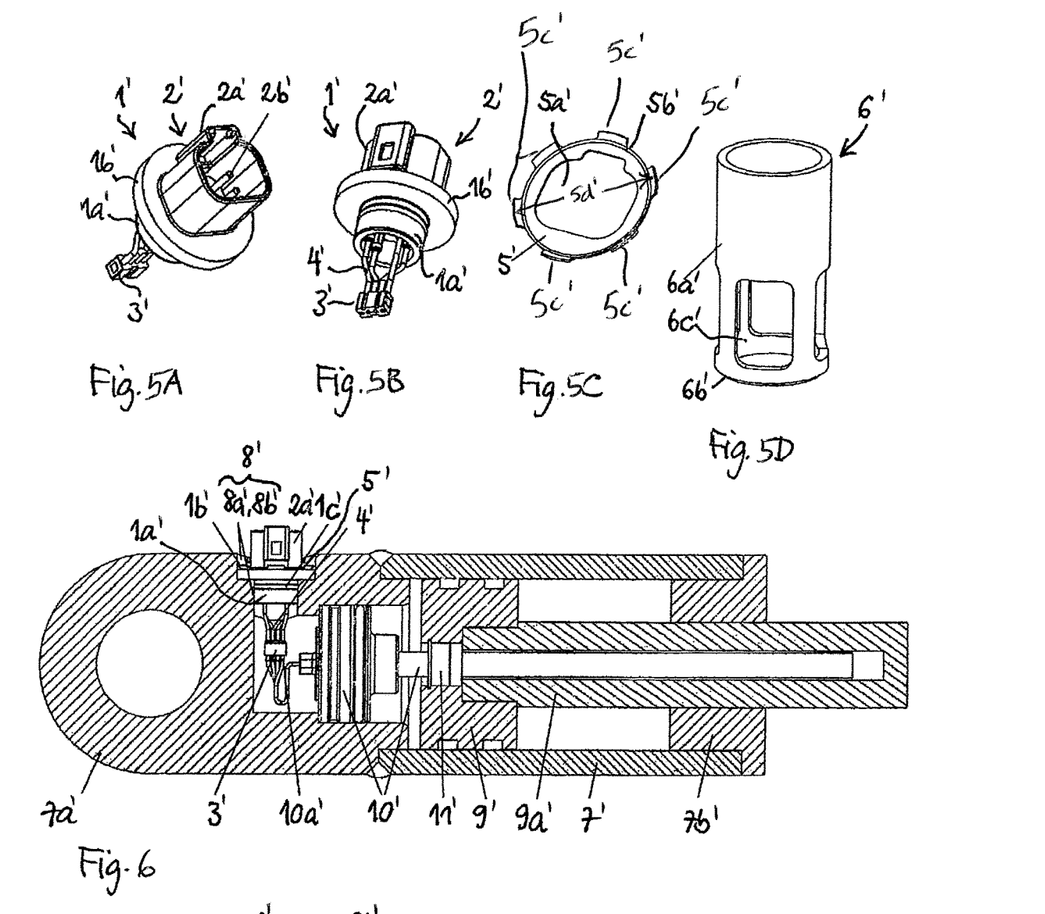
FIGS. 5A-5B are perspective views of a connector according to an embodiment of the present disclosure.
FIG. 5C is a perspective view of an embodiment of a crown disc according to an embodiment of the present disclosure.
FIG. 5D is a perspective view of a tool for installation of a crown disc.
FIG. 6 is a sectional view of a hydraulic cylinder in which a connector is installed.
Figure 7:
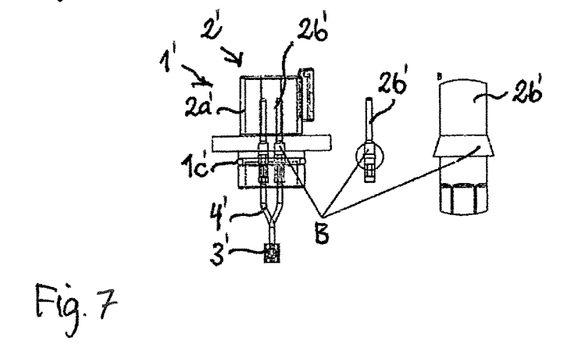
FIG. 7 is a synoptic view of the connection of contact pins and a connection part according to an embodiment of the present disclosure.

An alternate embodiment of the present disclosure is a connector 1' as shown in FIGS. 5A-5B and 7, described in greater detail below. Furthermore, a suitable tool in accordance with FIG. 5D is provided, and the disclosure also discusses a hydraulic cylinder in accordance with those shown in FIGS. 6, 8A-8H, and 9A-9B. Beneficial advantages of the disclosure are the subject of the dependent claims.

In this embodiment of the disclosure, the plug part has a case made of a thermoplastic material, which is in particular injection cast. As a material, any thermoplastic plastic proven for the production of electrical connector parts can be used as a material, such as an ABS material.

The plug part includes metallic contact pins, which are pressed into the second cylindrical section of the connector part in particular during the aforementioned version. In a preferred version, the contact pins have a conically shaped waistband, which lies in the second cylindrical section of the connector part and to a secure seal of the performance-inner side of the connector part compared to the Executive outer side contributes.

In a further version, the inside side of the connector element of the connector part has a plug-in connector terminal. A connector terminal is generally understood as any connecting part for individual conductor wires or strands or plug pins. Such terminals are commercially available in a wide variety and can be selected according to the specific application requirements of the disclosure. Because of the ease of handling, plug-in parts are preferred, but in principle screwable elements can also be considered.

Further submissions of the invention provide at least one sealing lip or seal ring at the outer section of the connecting part. In particular, the sealing lip or the sealing ring is arranged on the first cylindrical section of the connecting part. Depending on the requirements of the application, several sealing lips or rings may also be provided, possibly made of different materials. Sealing can also be done largely or completely by sealants attached or shaped to the connector part or to a sealant plug placed or sprayed on it.

In a further version, the fixation disc has an internal contour adapted to the outer contour of the plug part, so that it cannot be twisted in the condition placed on the connection part relative to the connection part, but in the hole together with the connecting part Twisting. This can also be achieved with an inner contour that is not ideally adapted to the outer contour of the plug part, but also, for example, with a rectangular or square inner contour.

In an even further version of the connector, the fixation disc is executed as a spring metal crown disc. In principle, however, other safety discs or completely different fixation or securing agents can also be used to fix the connection part in the graduated hole of the case. Depending on the application, these may alternatively be elements which cannot be easily removed, such as by gluing or other bonding.

A suitable tool for assembling the proposed connector device prefers a hollow-cylindrical base body with an external diameter adapted to the external diameter of the fixation disc of the connector and at least one lateral opening, preferably several similar openings, in the cylinder circumference, through which the fitter has a relatively good view of the plug part of the connector part located inside the tool during the assembly process and can easily check its location and, if necessary, correct it.

In versions of the tool, the basic body is not necessarily ideal and certainly not necessarily over its entire extension hollow-cylindrical, but can also include in sections only a hollow cylinder segment or also one from a hollow cylinder have a different basic shape. In any case, a shape of the tool is preferred, in which one end (which is applied in the use of the spring dart to be fixed with the tool) is circular.

The proposed hydraulic cylinder is characterized by the fact that in the wall of the headboard part of the hydraulic cylinder, a tiered hole with an inner drilling section with a first diameter and an outer drilling section with a second diameter larger than the first diameter is provided and the connection device of the connector system is fixed with the attached connector in the tiered hole.

FIGS. 1a' 5A and 5B show a connection part 4' of the inventive device. The connection part 4' has a first base section 1a' with a first outer diameter and a subsequent second cylindrical (disc-shaped) base section 1b' with a second, larger outer diameter. From the second, disc-shaped base body section 1b' of the connector part 1', a plug part 2' of a standardized design protrudes, which includes a plug case 2a' and contact pins 2b' consisting of a thermoplastic plastic. The plug case 2b' is in particular one-piece shaped to the connection part 1'.

On the opposite side, below the first base body section 1a', a connection plug 3' is arranged as an internal connection element of the connector device, which is electrically and mechanically connected with the contact pins 2b' of the plug part 2'. The connection plug 3' is designed for plugging and self-active fixation of ladder ends or plug pins (not shown here), which are attached to an electrical assembly or component to be connected via the connection part 1' (see below).

FIG. 5C shows a crown disc 5', which serves as a fixation disc of the connector device according to the disclosure. The crown disc 5' has a circular central opening 5a', the inner contour of which is adapted to the cross-sectional shape (outer contour) of the plug part 2', and a toothed outer circumference of 5b', which is sized to the outer diameter of the second cylindrical section 1b' of the connection part 1' (and thus at the same time adapted to the diameter of a drill mentioned below). The crown disc 5' is adapted for engagement and locking in the said hole with application of appropriate force (see also below). Teeth 5c' extend from outer circumference 5b', and in one embodiment, are spaced apart annularly around the outer circumference 5b'. Teeth 5c' extend to a widest diameter 5d' that is in one embodiment slightly larger than the diameter of the second cylindrical base section 4b'. The teeth 5c' are in one embodiment in an inclined orientation, with the teeth 5c' inclined toward the first section from a transition between the first section and the second section when the crown disc is properly installed.

FIG. 5D shows a tool 6' suitable for the installation of the crown disc 5' in the said hole. Tool 6' has a tubular or hollow-cylindrical base body 6a', the outer diameter of which, as well as the aforementioned outer contour of the crown disc 5', is tuned to the diameter of the outer, further part of the aforementioned hole. One end of the pipe piece 6a' has an opening 6b'. In the pipe piece 6a', four approximately rectangular shaped openings 6c' are provided, opposite each other. The purpose of the construction of tool 6', which was briefly sketched here, and its handling during the installation of the connector and especially the crown disc 5', will be explained below.

FIG. 6 shows in a longitudinal representation a general view of a hydraulic cylinder 7' as the execution of a thick-walled case part in which the connection part 1' according to one embodiment is used. The hydraulic cylinder 7' has a cylinder 7a' and a cylinder closure 7b', through which a piston rod 9a' of a piston 9' passes in the middle.

A position sensor assembly 10' is used to determine the position of piston 9' with the hydraulic cylinder 7' and works together with a position magnet 11', which is inserted into the piston rod 9a'. The exact structure and function of position sensor assembly 10' and position magnet 11' are irrelevant to the explanation of the present disclosure and are therefore not described here. It should be noted, however, that 10' connecting wires are made out of the position sensor assembly, the ends of which are grouped together in a position sensor plug 10a'.

As can be seen in FIG. 6, the connection part 1' sits so in hole 8' of the hydraulic cylinder 7' that its first base body section 1a' (see FIG. 5B) is stuck in inner section 8a' of hole 8' and the second base section 1b' in the outer drilling section 8b' and on the ring-shaped front side of the outer drilling section. In this position, the connection part 1' is held by the crown disc 5'. An O-Ring 1c', which sits in a groove in the first base body section 1a', seals the connection part 1' in the inner drilling section 8a'.

FIG. 7 shows the composite parts connection part 1', plug part 2', connector 3' and light connection 4' of the connector in a synoptic representation of side view and longitudinal section as well as in a detailed representation of a middle range of contact pins 2b' of plug part 2'. It can be seen that the contact pins 2b' have a conical covenant B, which, after pressing the contact figuration into the thermoplastic material of the connector part and plug enclosure, has a further improved seal between the top of the connection part 1' (with the plug part) and its underside (with the connection plug 3') and thus the total hydraulic cylinder 60 according to FIG. 6 to the atmosphere.

In the thick wall of hydraulic cylinder 7', a tiered hole 8' is created, which has an inner section 8a' with a first diameter and an outer section 8b' with a second, larger diameter.

FIGS. 8A-8H illustrate a way of using the system of FIGS. 5A-7 which is based on the figures explained above, the steps of the production of the connector device according to the disclosure. Only a few reference figures are included in these figures; With respect to the other parts/sections of the components shown, reference is made to FIGS. 5A-7 and the above explanations.

Figure 8A:
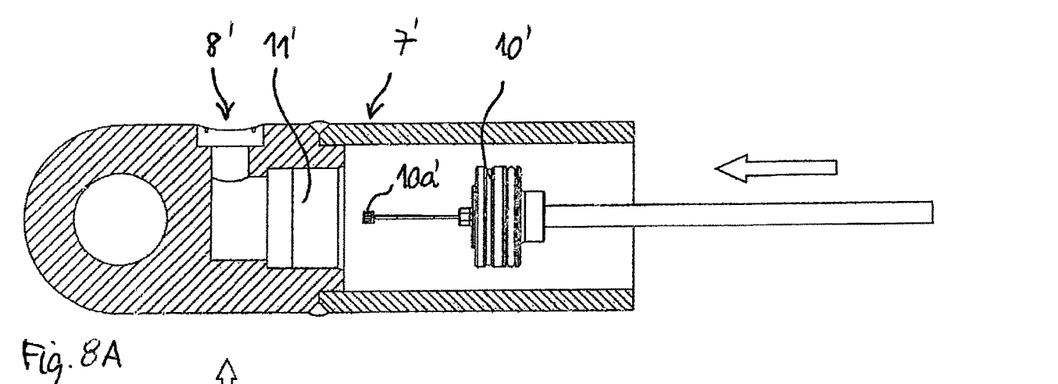
FIGS. 8A-8H show manufacturing steps of the assembly of a connector into a hydraulic cylinder.
Figure 8B:
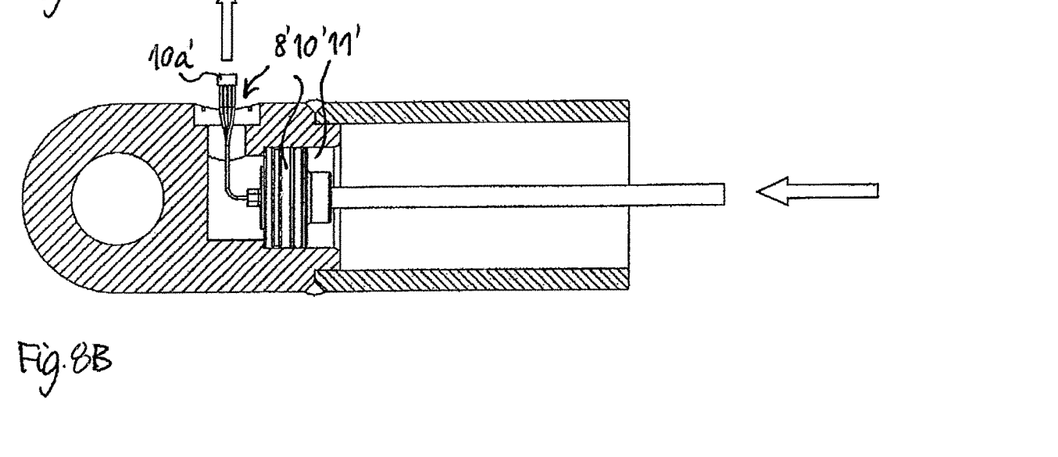
Figure 8C:
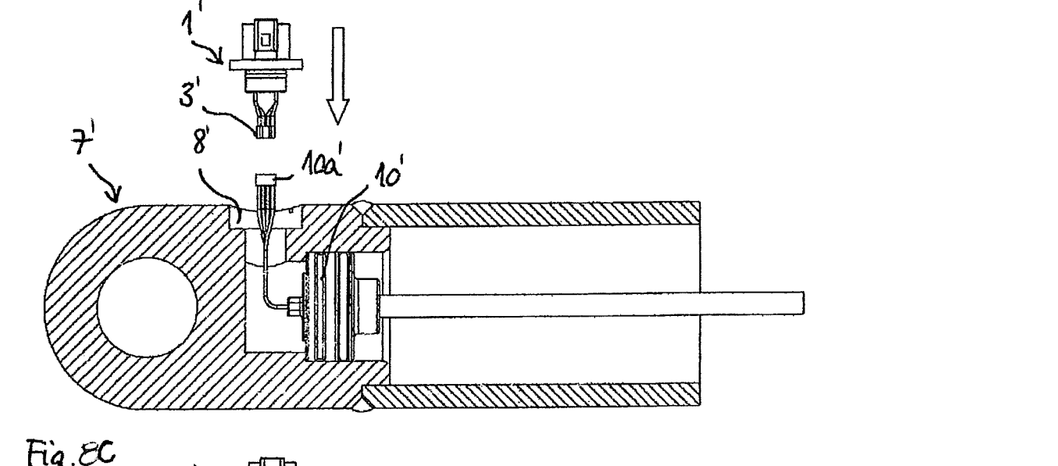

FIGS. 8A and 8B show how position sensor assembly 10' with its connection wires and its plug 10a' is axially aligned with the hydraulic cylinder 7'. In FIG. 8C is shown to have reached the target point of the hydraulic cylinder, 10' position sensor assembly 10', where it sits in a tiered axial hole 12' adapted to its outer shape. When inserted, the connecting wires with the plug part 10a' are guided through the graded radial hole 8' radial through the wall of the cylinder floor to the outside, the connecting wires with the plug part 10a' of sufficient length to extend to a point external to the wall of the cylinder 7' for connection to the plug connector 3'.

Figure 8D:
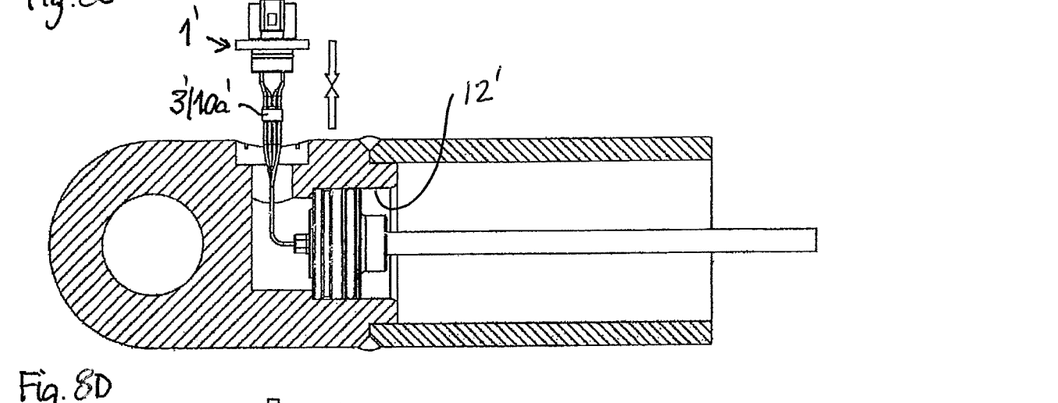
Figure 8E:
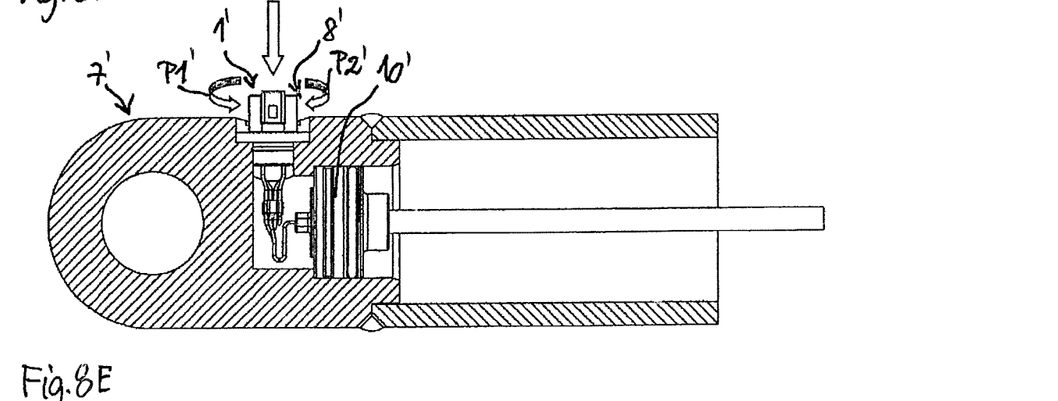

FIG. 8C-8E show how the position sensor plug 10a', which is guided by hole 8' outside hydraulic cylinder 7', is placed in such a way that the plug part 10a and the connection plug 3' interact with each other, and that finally the position with the position sensor assembly 10' connected connection part 1' is inserted into hole 8'. With the curved arrows P1', P2' in FIG. 8E is made clear that the connection part 1' in hole 8' is largely freely twisted for directing wires of the connection part 1' into a desired angle position in the outer wall of the hydraulic cylinder 7'.

Figure 8F:
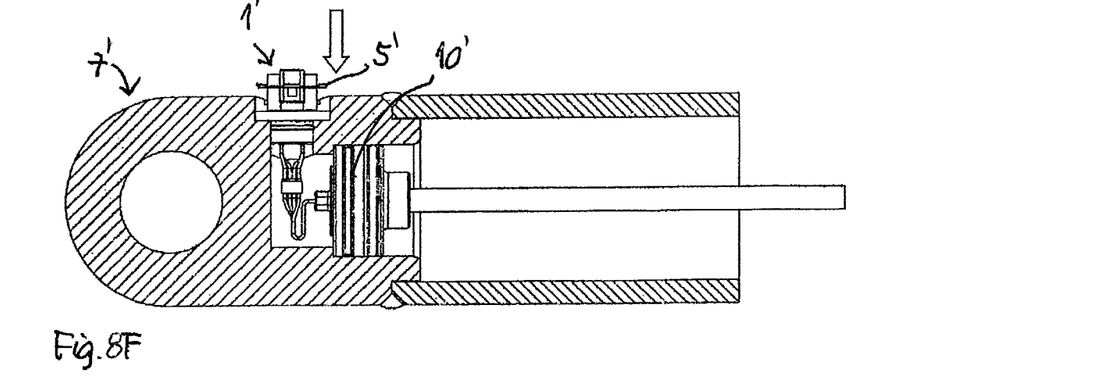
Figure 8G:
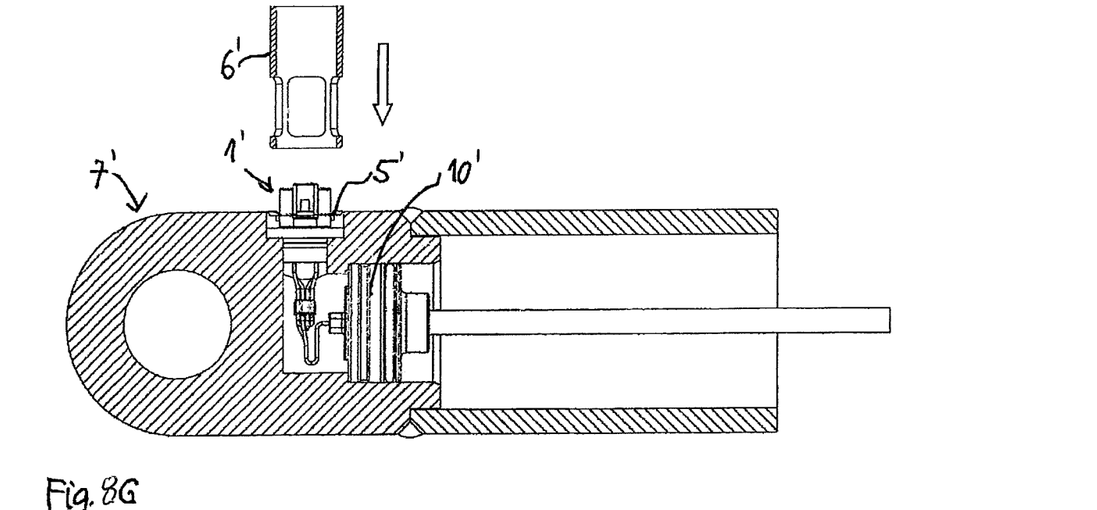
Figure 8H:
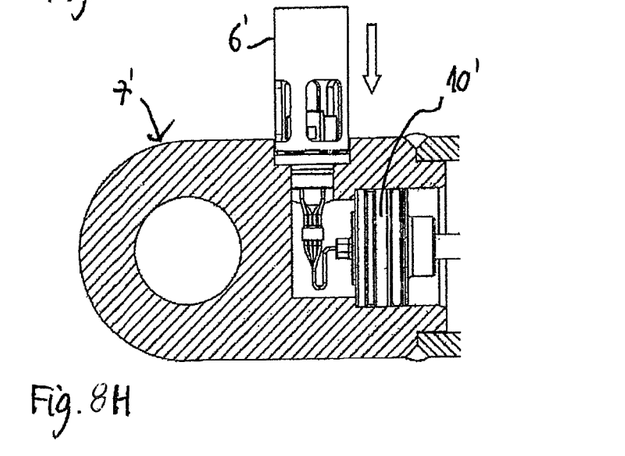
Figures 9A, 9B:
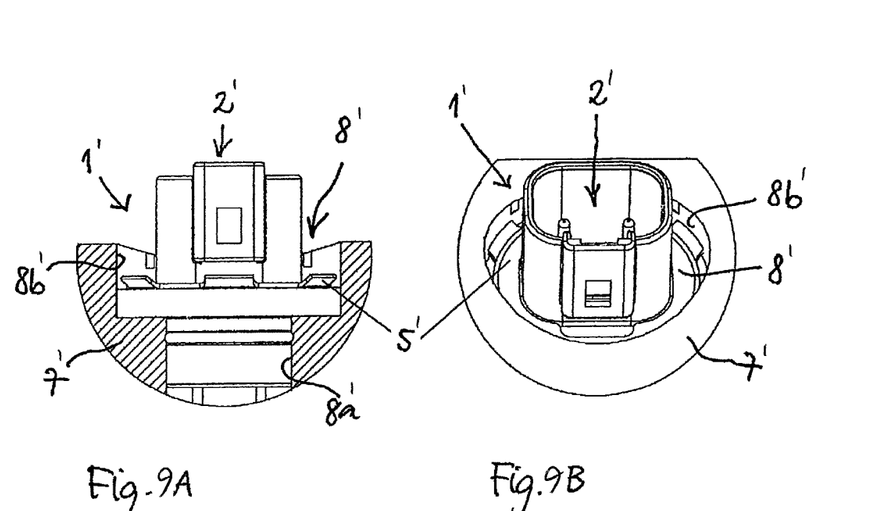
FIG. 9A is a partial section view of the section of the hydraulic cylinder according to FIG. 6, where the connector is installed.
FIG. 9B is a perspective view of a portion of the section of the hydraulic cylinder according to FIG. 6, where the connector is installed.

Like FIG. 8F shows the crown disc 5' is introduced into hole 8' by guiding the crown disc 5' over the plug part 2' of the connection part 1'. FIG. 8G shows the condition of crown disc 5' on hole 8'. FIG. 8G shows how the assembly tool 6' is then guided over the plug part 2' and placed radially on the crown disc 5'. Finally, the correctly aligned tool 6' radially is struck on the crown disc 5' and presses it into hole 8', whereupon the crown disc 5' fits snugly with the larger diameter opening wall (FIG. 8H). The final state of the hydraulic cylinder with mounted connector is shown in FIG. 7.

Moreover, the execution of the embodiments of the disclosure are also possible in a variety of variations of the examples shown here and aspects of the disclosure highlighted above.

What is claimed is:

1. A cable connection system for a thick-walled case having a tiered cable opening with an inner portion and an outer portion, the inner portion having a first diameter, and the outer portion having a second diameter larger than the first diameter, the cable connection system comprising:
   a connecting part rotatably mountable in the tiered cable opening to direct cables of the cable connection system into a desired angular position with respect to the case, the connecting part comprising:
      a body with a first section having a first section diameter matching the inner portion first diameter and a second section having a second section diameter matching the outer portion second diameter; and
   a fixation disc is a spring metal crown disc configured to lock the connecting part into the tiered cable opening when the cables of the cable connection system are adjusted to the desired angular position, the fixation disc having a central opening having an inner diameter sized to fit over the second section diameter and a shaped outer contour having an outer diameter greater than the second section diameter and configured to press into the outer portion and wherein the shaped outer contour comprises an outer circumference with a plurality of teeth having ends configured to engage the outer portion wherein adjacent teeth are annularly spaced apart about the outer circumference.

2. The cable connection system of claim 1, wherein the connecting part further comprises:
  a plug part extending outward from the second section; and
  a connection plug extending inward from the first section, the plug part and the connection plug electrically connected.

3. The cable connection system of claim 1, wherein the plurality of teeth are configured in a inclined orientation toward the first section from a transition between the first section and the second section.

4. The cable connection system of claim 2, wherein the plug part has a case made of a thermoplastic material.

5. The cable connection system of claim 4, wherein the plug part comprises metallic contact pins pressed into the second section of the body.

6. The cable connection system of claim 5, wherein the metallic contact pins have a conically shaped portion, which lies in the second section of the body.

7. The cable connection system of claim 2, wherein the connection plug of the connecting part has a plug connector.

8. The cable connection system of claim 2, and further comprising a sealing ring at an outer circumference of the connecting part, configured to seal against a shelf between the inner portion and the outer portion of the tiered cable opening.

9. The cable connection system of claim 2, and further comprising:
  a tool for installation of the connecting part, the tool comprising:
    a hollow cylindrical body having an external diameter adapted to the external diameter of the fixation disc.

10. The cable connection system of claim 9, wherein one end of the hollow cylindrical body has a shape adapted to engage the fixation disc of the cable connection system.

11. The cable connection system of claim 2, wherein the thick-walled case comprises a hydraulic cylinder of a hydraulic system, the hydraulic cylinder having an electrical or electronic assembly used.

12. The cable connection system of claim 1, wherein the connecting part further comprises:
  a central through-hole; and
  a deflection element rotatable in the tiered cable opening to direct cabling routing in a determined direction.

13. The cable connection system of claim 12, and further comprising:
  a tool for installation of the connecting part, the tool comprising:
    a hollow cylindrical body having an external diameter adapted to the external diameter of the fixation disc; and
    at least one lateral opening in a lower portion of the hollow cylindrical base body.

14. The cable connection system of claim 13, wherein the at least one lateral opening is four lateral openings evenly spaced about a circumference of the hollow cylindrical body.

* * * * *